No. 31,859.  
G. W. BLAKE.  
BELT FASTENING.  
PATENTED MAR. 26, 1861.
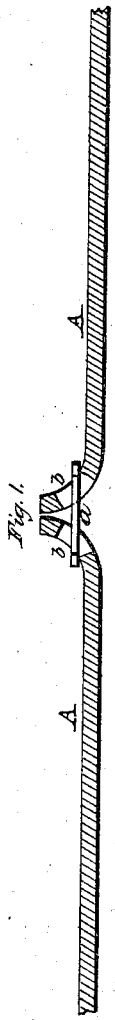
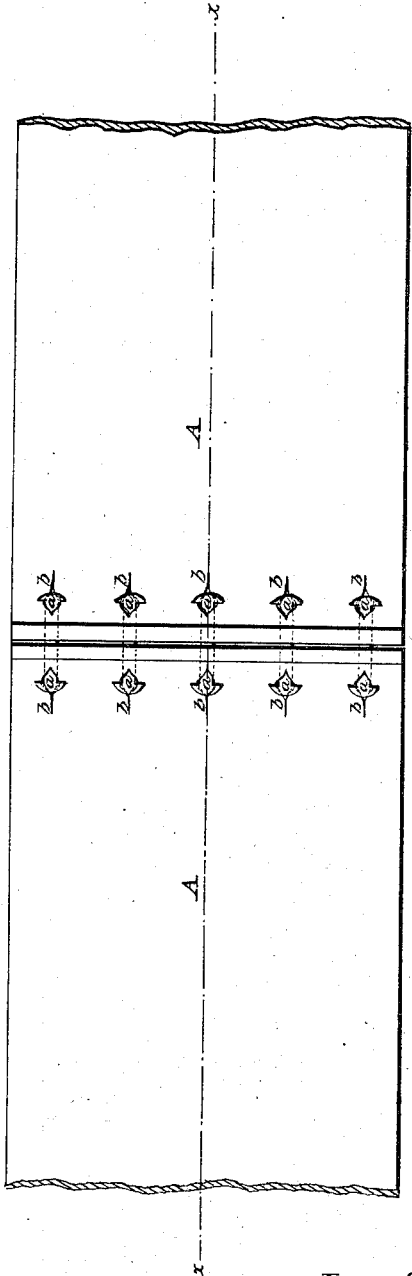
Witnesses:  
J. W. Coombs  
R. S. Spencer
Inventor:  
G. W. Blake  
per Munn & Co.  
Attorneys

UNITED STATES PATENT OFFICE.

GEORGE W. BLAKE, OF EAST PEPPERELL, MASSACHUSETTS, ASSIGNOR TO HIMSELF AND L. W. BLAKE, OF SAME PLACE.

BELT-FASTENING.

Specification forming part of Letters Patent No. 31,859, dated March 26, 1861; Reissued August 4, 1868, No. 3,065.

*To all whom it may concern:*

Be it known that I, GEORGE W. BLAKE, of East Pepperell, in the county of Middlesex and State of Massachusetts, have invented a new and Improved Belt-Fastening; and I do hereby declare that the following is a full, clear, and exact description thereof, reference being had to the accompanying drawings, making a part of this specification, in which—

Figure 1, is a longitudinal section through two ends of a belt secured together with the improved fastening. Fig. 2, is a top view of the ends of a belt secured as in Fig. 1. Fig. 3, represents a perspective view of one of the belt fastenings.

Similar letters of reference indicate corresponding parts in the three figures.

To enable those skilled in the art to make and use my invention I will proceed to describe its construction and operation.

A. A. represent the ends of two sections of leather belting which are secured together with studs $a, a, a, a, a,$ as represented in Figs. 1 and 2, of the drawings.

The ends of the sections of belting which it is desired to secure together, are first cut off square, then with a suitable instrument short slits $b, b, b,$ are cut through the ends of each belt near to the end of the same or as far back from the edge as may be desired. These slits should be cut in a direction with the length of the belt and care should be taken that the distance between the slits of one section should correspond with the distance between the slits through the end of the opposite section, thereby bringing the longitudinal edges of the two sections of belting in a line with each other. These slits should all be made about the same length, which is determined by the size of the heads on the studs to be used in forming the junction of the two sections of belting.

The studs $a, a,$ which are used to connect the ends of the belting together, consist of flat pieces of metal of a suitable length and strength having a long straight neck terminating at each end in segmental heads as clearly represented in Fig. 3 of the drawings. The size of these studs must be determined by the size and strength of the belting to which they are to be applied and the number of studs used will depend upon the width of the belt to be used. These studs may be readily punched out from a sheet of metal with a suitable instrument and they may thus be made at a trifling cost. When the ends of the sections of belts which are to be united are prepared with their slits $b, b,$ as before described the studs are all passed through the slits $b,$ flatwise and then turned so as to lie flat on the outside surface of the belting as represented in Figs. 1 and 2 of the drawings in which position they will remain, and their heads will prevent the belt from being drawn apart at the junction.

In order to detach the ends of the belt thus united, the studs are turned at right angles to the positions represented in Figs. 1 and 2, viz: in the position in which they were placed to enter the slits, and the ends of the belts may be drawn apart.

The advantages I claim for the above method of fastening the ends of belts are, cheapness, combined with the firm hold which the fastening forms, and the simplicity with which the fastening can be made while at the same time it is not objectionable to belts for any and every purpose to which they can be applied.

Having thus described my invention what I claim as new and desire to secure by Letters Patent is—

The employment of the double headed studs, $a, a,$ in combination with the belt ends, in the manner and for the purposes herein shown and described.

GEORGE W. BLAKE.

Witnesses:
C. W. BELLOWS,
W. P. BENNETT.